(12) United States Patent
Chen et al.

(10) Patent No.: US 8,146,923 B2
(45) Date of Patent: Apr. 3, 2012

(54) VACUUM APPARATUS OF ROTARY MOTION ENTRY

(75) Inventors: Kuan-Chou Chen, Hsinchu (TW);
Fu-Ching Tung, Hsinchu (TW);
Chia-Ming Chen, Changhua County (TW); Pei-Shan Wu, Taipei County (TW); Tean-Mu Shen, Hsinchu (TW);
Jung-Chen Ho, Hsinchu (TW)

(73) Assignee: Industrial Technology Research Institute, Hsin-Chu (TW)

( * ) Notice: Subject to any disclaimer, the term of this patent is extended or adjusted under 35 U.S.C. 154(b) by 296 days.

(21) Appl. No.: 12/615,811

(22) Filed: Nov. 10, 2009

(65) Prior Publication Data
US 2011/0079963 A1    Apr. 7, 2011

(30) Foreign Application Priority Data
Oct. 2, 2009   (TW) .............................. 98133583 A

(51) Int. Cl.
*F16J 15/54* (2006.01)
(52) U.S. Cl. ........................................ 277/353; 277/913
(58) Field of Classification Search .................. 277/353, 277/530, 903, 907, 910, 913; 464/17
See application file for complete search history.

(56) References Cited

U.S. PATENT DOCUMENTS

| | | | | |
|---|---|---|---|---|
| 2,488,200 A | * | 11/1949 | Juhlin et al. | 277/907 |
| 3,361,490 A | * | 1/1968 | Bassan | 277/913 |
| 4,501,566 A | * | 2/1985 | Carlson et al. | 277/913 |
| 6,857,635 B1 | | 2/2005 | Li et al. | |

FOREIGN PATENT DOCUMENTS

| | | |
|---|---|---|
| TW | 435684 Y | 5/2001 |
| TW | 247855 B | 1/2006 |

* cited by examiner

*Primary Examiner* — Gregory Binda
(74) *Attorney, Agent, or Firm* — Morris Manning & Martin LLP; Tim Tingkang Xia, Esq.

(57) ABSTRACT

A vacuum apparatus of rotary motion entry is disclosed, which comprises: a shaft sleeve, disposed on a cavity wall of a vacuum system; a rotary shaft, ensheathed by the shaft sleeve; and a transmission set, connected to the rotary shaft for driving the same; wherein, the rotary shaft is disposed passing through a hole formed on the base of the shaft sleeve while there are a first bearing, a second bearing, a sealing ring and a shaft seal being arranged separately inside the hole. Moreover, the shaft seal has a flake-like lip flange formed extending toward the center of the hole, that is capable of being extended away from the vacuum system by the inserting of the rotary shaft into the hole, and thereby, enabling the lip flange to engage with the rotary shaft tightly by the atmospheric pressure and thus isolating the outside world from the vacuum system.

25 Claims, 5 Drawing Sheets

VACUUM APPARATUS OF ROTARY MOTION ENTRY

TECHNICAL FIELD

The present disclosure relates to a device for transmitting power into a vacuum system, and more particularly, to a vacuum apparatus of rotary motion entry capable of transmitting rotary motions into a vacuum system while maintaining the vacuum of the vacuum system during the operation of the vacuum system.

TECHNICAL BACKGROUND

During the production of optic-electronic products in the industries such as semiconductor industry, flat panel display industry and solar cell industry, it is usually required to perform a process for coating a layer of thin film on a substrate whereas the substrate can be a silicon wafer or a glass substrate for enabling the substrate to have a specific characteristic, such as electric conductivity, anti-reflection ability or the capability of a reaction film, and so on. It is noted that no matter the layer of thin film is formed by a PVD sputtering deposition device or a CVD deposition device, a high level of cleanliness or vacuum in such deposition devices is always a necessity for obtaining high-quality products whereas that can only be achieved by the use of certain vacuum systems.

The vacuum systems are referred to those required to operate under a vacuum environment, inside that the chamber thereof is vacuumed according to the characteristic of vacuum physics for dropping its interior pressure to an operation pressure so as to adapted the vacuum system for a manufacture process. Nevertheless, in addition to the vacuum environment, it still requires a feedthrough device for coupling rotary motions, linear motions, or screw motions of a mechanical device from a high-pressure (atmospheric) environment to the low-pressure (vacuum) environment of the vacuum system for powering the components inside the vacuum system to perform the manufacture process. Thus, for preventing any leakage from happening at the joint of the vacuum system and its power source, it is important to have a feedthrough device capable of achieving static seal and dynamic seal simultaneously between the vacuum system and its power source.

In a conventional rotary motion feedthrough device, there are a magnet and a ferrofluid unit being arranged between its rotation shaft and base in addition to those essential components such as bearings and seals. By the interaction between magnet and the ferrofluid with the metallic shaft and base, the shaft can be permit to turn freely but serves to block the flow of gas axially along the shaft, thereby allowing a pressure difference to exist between the "atmosphere" and "vacuum" sides, respectively, of the feedthrough device, which are exemplified in the disclosures of U.S. Pat. No. 6,857,635 and TW Pub. No. 435684.

However, such rotary motion feedthrough device using magnetic coupling not only can be very expensive, but also it can not function normally under an environment of temperature higher than 80° C. since the ferrofluids in the ferrofluid unit may lose their magnetic properties at such sufficiently high temperatures, and thereby, cause the airtight isolation between the atmosphere side and the vacuum side to fail.

In addition, there are already many studies designed for achieving the aforesaid isolation between the atmosphere side and the vacuum side without the use of the aforesaid ferrofluid magnet coupling. One of which is a vacuum rotary motion feedthrough device disclosed in TW I247855, which can achieve the airtight isolation by the arrangement of O-rings between the base and the shaft and forming the base as a stepwise structure.

Nevertheless, if the O-rings are not expanded by pressure, the airtight isolation might not be sufficient since there may be insufficient contact between the O-rings and the shaft may be too small or simply without contact therebetween, as disclosed in TW Pub. No. 435684. On the other hand, when the O-rings are not expanded by pressure and tightly pressed upon the shaft, the O-rings may be worn off by the turning of the shaft. In addition, as the operating vacuum system may produce heat that is transmitted to the shaft, the base and the O-rings, the aging of the O-rings can be enhanced by the resulting high temperature and thus cause the airtight isolation between the atmosphere side and the vacuum side to fail.

Therefore, it is in need of an improved vacuum apparatus of rotary motion entry capable of transmitting motions into a vacuum system while maintaining the vacuum of the vacuum system during the operation of the vacuum system.

TECHNICAL SUMMARY

The present disclosure provides a vacuum apparatus of rotary motion entry capable of forming a circular barrier on its rotation shaft extending into a vacuum system for preventing air from entering into the vacuum system so as to maintain the vacuum of the vacuum system.

Moreover, the disclosure provides a vacuum apparatus of rotary motion entry capable of effectively overcoming the problem relating to the transmission of power in a high-temperature vacuum environment by incorporate a cooling module with its hollow rotation shaft.

In addition, the disclosure provides a vacuum apparatus of rotary motion entry capable of having a square-shaped four-lip sealing ring to be disposed at a position between its base and rotation shaft while enabling the concave arc regions formed between the lips to be filled with high vacuum grease so as to achieve a good airtightness by the cooperation of the sealing ring, the rotation shaft and the base and also maintain a low friction contact between the sealing ring and the rotation shaft.

Accordingly, in an embodiment of the present disclosure, a vacuum apparatus of rotary motion entry is provided, which comprises: a shaft sleeve, disposed on a cavity wall of a vacuum system; a rotary shaft, ensheathed by the shaft sleeve; and a transmission set, connected to the rotary shaft for driving the same; wherein, the rotary shaft is disposed passing through a hole formed on a base of the shaft sleeve while fixing the shaft sleeve on the cavity wall of the vacuum system by the use of an extension extending outwardly from an end of the base of the shaft sleeve; and there are a first bearing, a second bearing, a sealing ring and a shaft seal being arranged separately inside the hole at positions spaced from each other and corresponding to the rotary shaft while enabling the first bearing and the second bearing to be used for carrying the rotary shaft without obstructing the same from rotating, and enabling the shaft seal to be disposed at a side away from the vacuum system; and the shaft seal, being designed with a flake-like lip flange formed at an end thereof away from the extension of the base while extending toward the center of the hole, is enabled to warp around the circumference of the rotary shaft by the lip flange as the lip flange is capable of being forced to extend in a direction away from the extension by the inserting of the rotary shaft into the hole.

Accordingly, there are two tiers of airtight isolations formed by the use of the sealing ring and the shaft seal. Particularly, as the lip flange is enabled to wrap around the circumference of the rotary shaft when the lip flange is being extended in a direction away from the cavity wall by the inserting of the rotary shaft into the hole, a negative pressure will be formed at the side of the shaft seal neighboring to the vacuum system for forcing the lip flange to contact with the rotary shaft tightly by the atmospheric pressure and thus forming a circular barrier for isolating the outside world from the vacuum system so as to ensure the vacuum of the vacuum system.

In another embodiment, the rotary shaft is hollowed to form an inner hole that is provided for a cooling water tube to be inserted therein as the cooling water tube is connected to a cooling module, by that the rotary shaft can be cooled down effectively by the circulation of the cooling water flowing inside the cooling water tube so that the aging of the sealing ring and the shaft seal resulting from contacting with the high-temperature rotating rotary shaft can be prevented and thus the airtight isolation between the atmosphere side and the vacuum side can be ensured.

In addition, it is noted that the sealing rings used in the present disclosure are all square-shaped four-lip sealing rings, and as each sealing ring is capable of using only two of its lips for achieving an airtightness between the sealing ring and the base while enabling anther two lips of the same sealing ring to be used for achieving another airtightness between the sealing ring and the rotary shaft; and as there are high vacuum greases being filled in the concave arc regions formed between any two neighboring lips, a good airtightness can be achieved by the cooperation of the sealing rings, the rotation shaft and the base and also a low friction contact between the sealing ring and the rotation shaft can be maintained.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1:
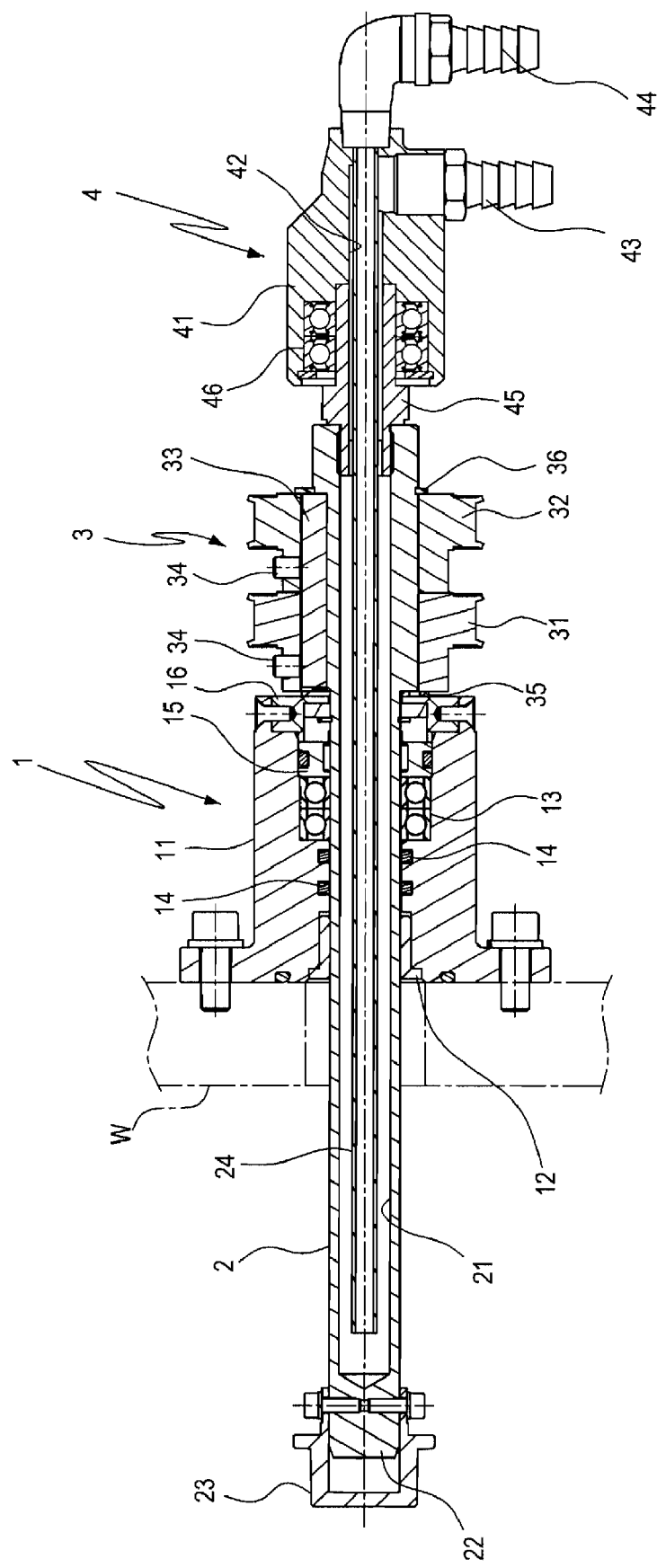
FIG. 1 is a sectional view of a vacuum apparatus of rotary motion entry according to an embodiment of the present disclosure.
Figure 2:
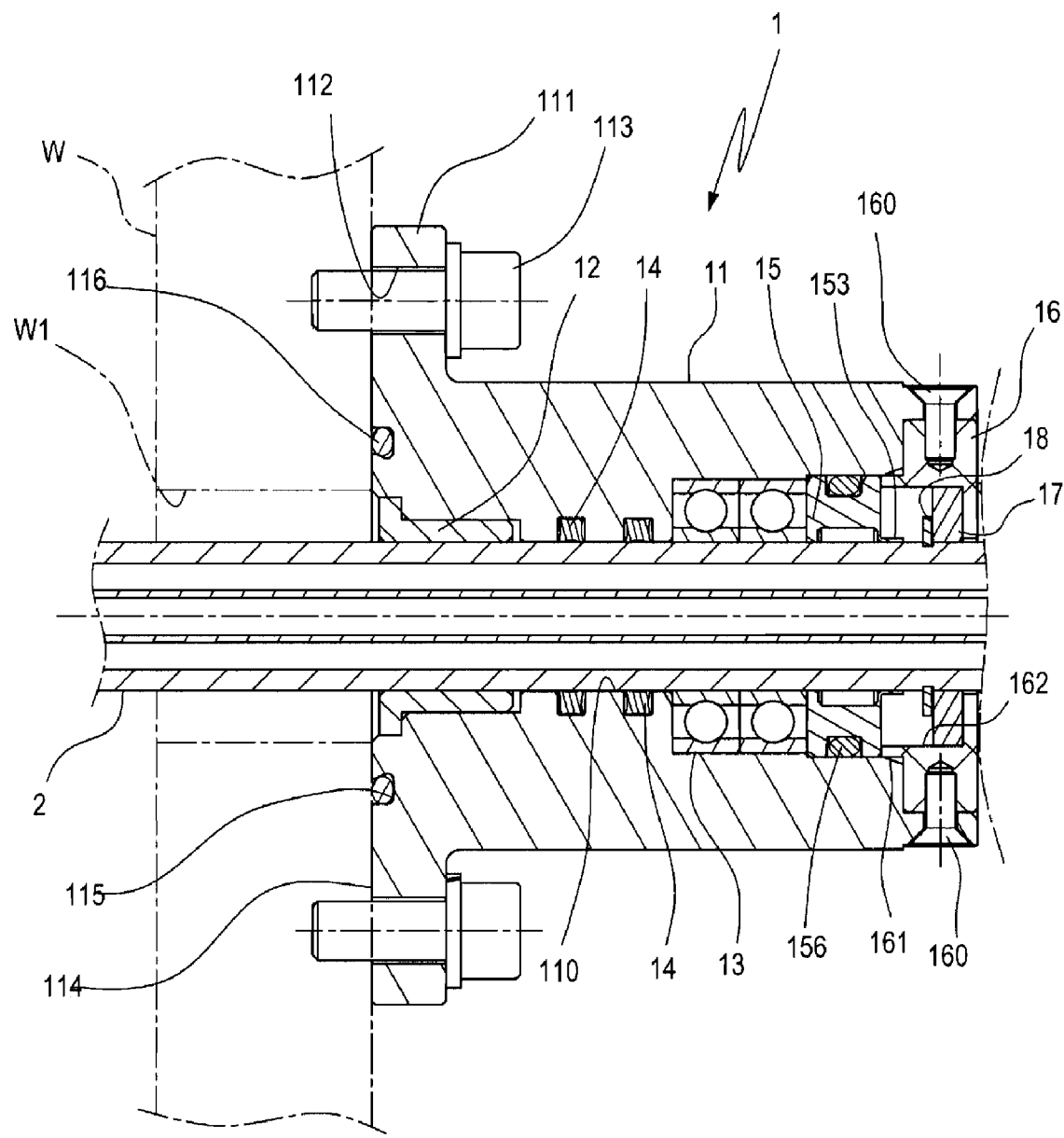
FIG. 2 is a sectional view of a base used in a vacuum apparatus of rotary motion entry according to an embodiment of the present disclosure.
Figure 3:
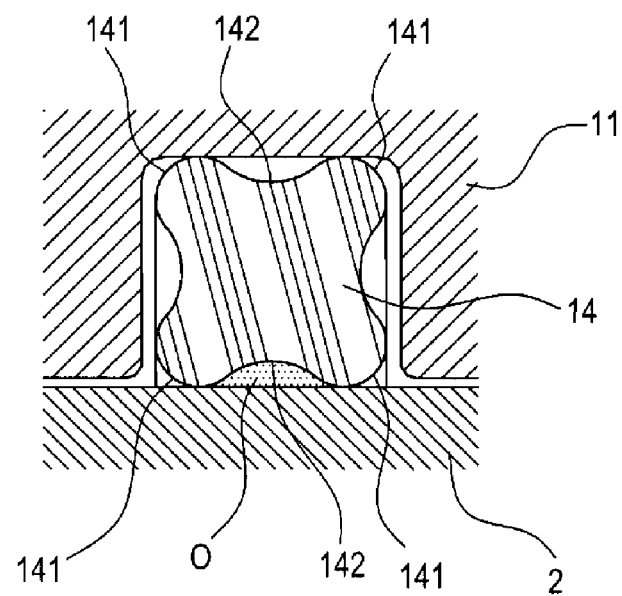
FIG. 3 is a sectional view of a sealing ring used in a vacuum apparatus of rotary motion entry according to an embodiment of the present disclosure.
Figure 4:
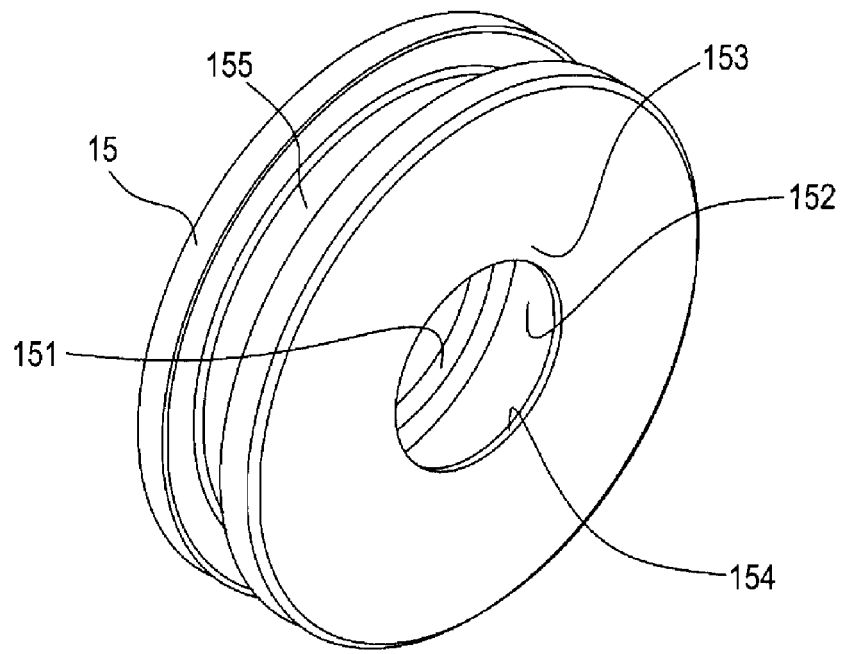
FIG. 4 is a three dimensional view of a shaft seal used in a vacuum apparatus of rotary motion entry according to an embodiment of the present disclosure.
Figure 5:
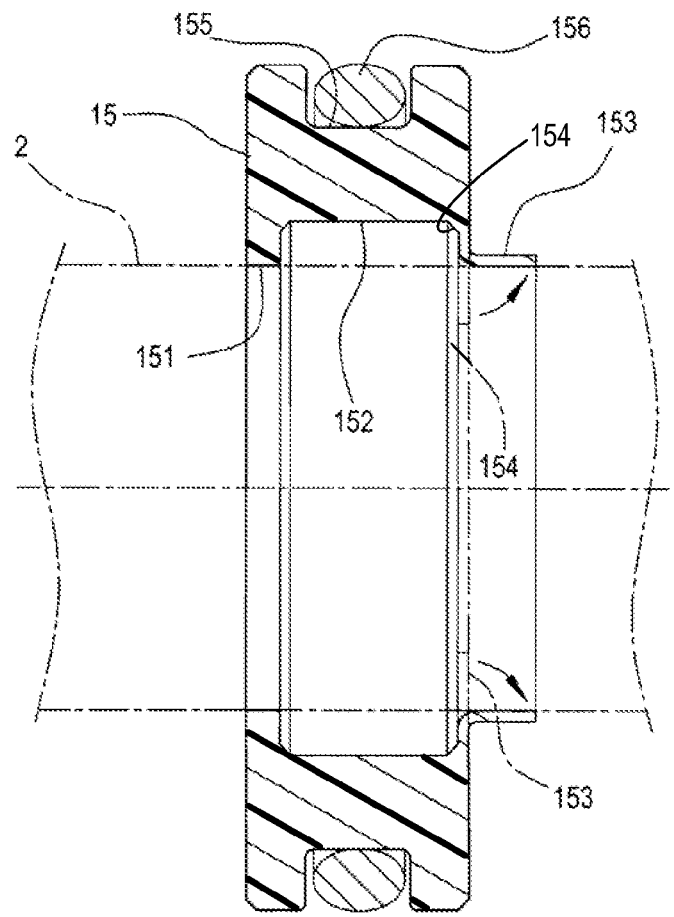
FIG. 5 is a sectional view of a shaft seal used in a vacuum apparatus of rotary motion entry according to an embodiment of the present disclosure.
Figure 6:
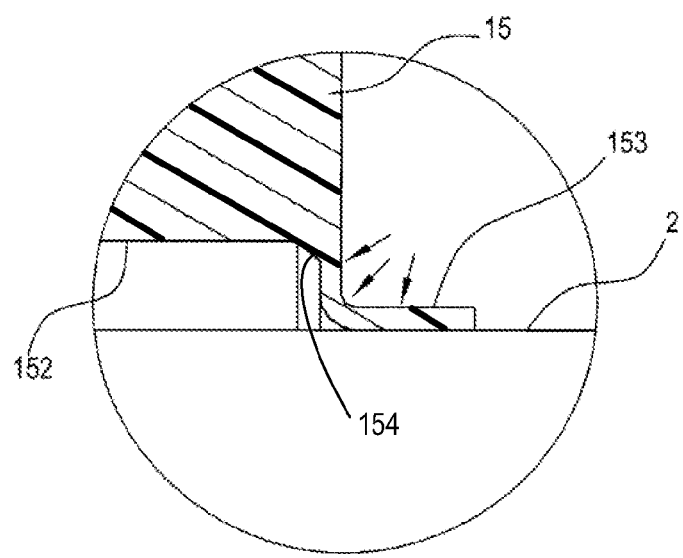
FIG. 6 is a schematic diagram showing how a lip flange of a sealing ring is enabled to wrap around the circumference of the rotary shaft according to an embodiment of the present disclosure.
Figure 7:
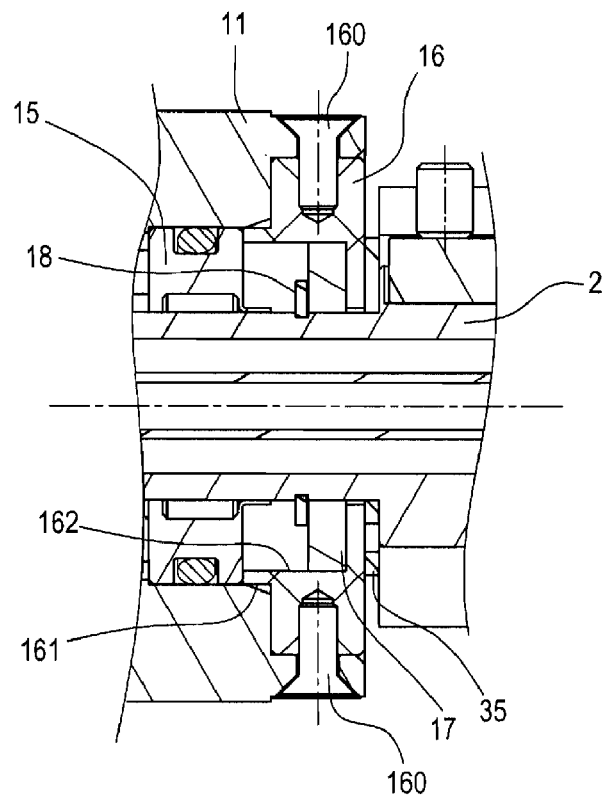
FIG. 7 is a sectional view of a pressing ring used in a vacuum apparatus of rotary motion entry according to an embodiment of the present disclosure.
Figure 8:
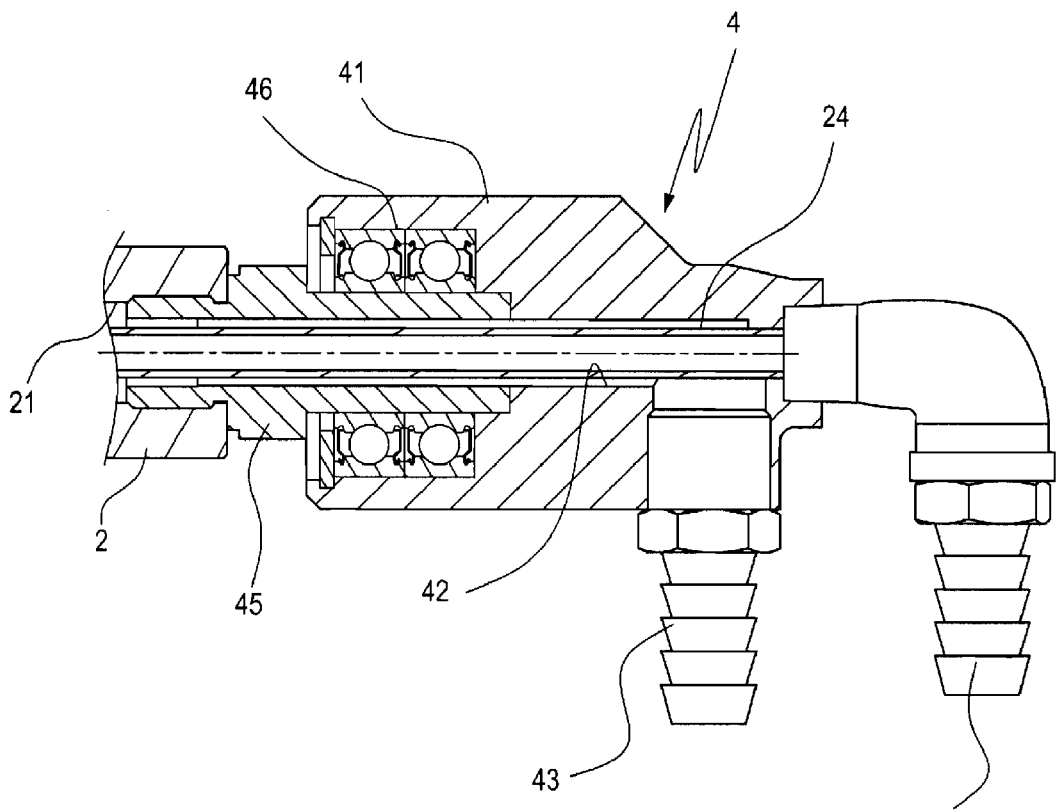
FIG. 8 is a sectional view of a cooling module used in a vacuum apparatus of rotary motion entry according to an embodiment of the present disclosure.

FIG. 1 is a sectional view of a vacuum apparatus of rotary motion entry according to an embodiment of the present disclosure; FIG. 2 is a sectional view of a base used in a vacuum apparatus of rotary motion entry according to an embodiment of the present disclosure; FIG. 3 is a sectional view of a sealing ring used in a vacuum apparatus of rotary motion entry according to an embodiment of the present disclosure; FIG. 4 is a three dimensional view of a shaft seal used in a vacuum apparatus of rotary motion entry according to an embodiment of the present disclosure; FIG. 5 is a sectional view of a shaft seal used in a vacuum apparatus of rotary motion entry according to an embodiment of the present disclosure; FIG. 6 is a schematic diagram showing how a lip flange of a sealing ring is enabled to wrap around the circumference of the rotary shaft according to an embodiment of the present disclosure; FIG. 7 is a sectional view of a pressing ring used in a vacuum apparatus of rotary motion entry according to an embodiment of the present disclosure; FIG. 8 is a sectional view of a cooling module used in a vacuum apparatus of rotary motion entry according to an embodiment of the present disclosure.

As shown in FIG. 1 and FIG. 2, the vacuum apparatus of rotary motion entry of the present disclosure is adapted to be fitted to a cavity wall W of a vacuum system as the vacuum apparatus of rotary motion entry is composed of: a shaft sleeve 1, fixedly secured to the cavity wall W; a rotary shaft 2, ensheathed by the shaft sleeve 1; a transmission set 3, connected to the rotary shaft 2 for driving the same; and a cooling module 4, also coupled to the rotary shaft 2.

The shaft sleeve 1 has a base 11, which comprises: a hole 110 being formed axially penetrating the base 11; and an extension 111, formed extending from an end thereof. Moreover, the extension 111 of the base 11 is configured with a plurality of via holes 112, each provided for a bolt 113 to piece therethrough so as to fixedly secure the base 11 on the cavity wall W of the vacuum system. It is noted that there is a hole W1 formed on the cavity wall W at a position corresponding to the hole 110, that is provided for the rotary shaft 2 inside the shaft sleeve 1 to enter the vacuum cavity of the vacuum system therethrough. In addition, the base 11 is formed with a circular groove 115 at an end surface 114 thereof just next to its extension 111 that is provided for an O-ring 116 to inset therein so as to achieve an airtightness effect between the cavity wall W and the base 11.

In FIG. 1 and FIG. 2, there are a first bearing 12 and a second bearing 13 being disposed spaced from each other and at positions corresponding to the rotary shaft in a manner that the first bearing 12 and the second bearing 13 are used for carrying the rotary shaft 2 without obstructing the same from rotating. In this embodiment, the first bearing 12, being a self-lubricating bearing, is disposed inside the hole 110 at the end surface 114, while the second bearing 13, being composed of two ball bearings, is disposed inside the hole 110 at about the middle section thereof. Substantially, each of the first and the second bearings 12, 13 can be a bearing selected from the group consisting of: a self-lubricating bearing, a ball bearing, and the like, which is not limited by the aforesaid embodiment.

Moreover, there is at least one sealing ring 14 being disposed inside the hole 110 of the base 11 at a position corresponding to the rotary shaft 2 and between the first bearing 12 and the second bearing 13. In this embodiment, there are two sealing rings 14 being arranged inside the hole 110 while being spaced from each other by an interval. As shown in FIG. 3, each of the two sealing rings 14 is a square-shaped four-lip sealing ring, whose cross section is shaped like a square having four arc-shape lips 141 to be formed respectively at the four corners of the square, by that there is a concave arc region 142 being formed between any two neighboring lips 141 to be filled with high vacuum grease O for achieving a good airtightness by the cooperation of the sealing rings 14, the rotation shaft 2 and the base 11 and also maintain a low friction contact between each sealing ring 14 and the rotation shaft 2.

The rotary shaft 2 is further being ensheathed by a shaft seal 15 for preparing the same to be received inside the hole 110 of the base 11, in that the shaft seal 15 is mounted at a side of the second bearing 13 that is not facing toward the first bearing 12. As shown in FIG. 4 to FIG. 6, the shaft seal 15 is a ring-like structure made of an engineering rubber-plastic product. In FIG. 4, the shaft seal 15 is formed with a circular hole 151 at the center thereof corresponding to the rotary shaft 2, and there is a ring-shape concave 152 formed at the middle section of the hole 151 to be provided for holding a high-vacuum grease therein, as shown in FIG. 5. Moreover, shaft seal 15 is configured with a flake-like lip flange 153 inside the hole 151 at a position away from the cavity wall W while extending toward the center of the hole 151 in a manner that it can formed a tapered area 154 inside the hole 151 that can be enabled to warp around the circumference of the rotary shaft 2 by the lip flange 153 as the lip flange 153 is capable of being forced to extend in a direction away from the cavity wall W by the inserting of the rotary shaft 2 into the hole 151, as shown in FIG. 5 and FIG. 6.

In addition, the shaft seal 15 is formed with a circular groove 155 at the outer circumference thereof, and the circular groove 155 is provided for an O-ring 156 to inset therein so as to achieve an airtightness effect between the shaft seal 15 and the base 11.

As shown in FIG. 2 to FIG. 7, there is a pressing ring 16 being fixedly disposed at an end of the hole 100 on the base 11 at a position that is close to the shaft seal 15 to be used for fixing the shaft seal 15 by packing. It is noted that the pressing ring 16 can be fixed to the base 11 by the use of a plurality of screws 160; and the pressing ring 16 is formed with an protruding collar 161 at an end thereof that is extending inside the hole 110 and abutting against the shaft seal 15 for fixedly packing the same.

Moreover, the pressing ring 16 is further formed with a concave 162 at the end where the protruding collar 161 is disposed; and the concave 162 is provided for an interface bearing 17 to inset therein while enabling one surface of the interface bearing 17 to engage with the interior surface of the concave 162 and another surface thereof to engage with an axle retaining ring 18 as the axle retaining ring 18 is clampedly mounted on the rotary shaft 2 for axially positioning the rotary shaft 2 with respect to the shaft sleeve 1.

In this embodiment, the rotary shaft 2 is hollowed so as to form an inner hole 21 while designing the hollowed rotary shaft 2 with a closed end 22 provided for penetrating the shaft sleeve 1 and extending into a vacuum cavity of the vacuum system. In addition, the closed end 22 is integrated with a guide wheel 23 to be used for coupling to and thus driving a device in the vacuum system that is corresponding thereto. It is noted that the guide wheel 23 can be a device selected from the group consisting of: a friction wheel, a gear and a worm gear.

As shown in FIG. 1 to FIG. 8, there is a cooling water tube 24 being received inside the inner hole 21 of the rotary shaft 2 in a manner that it is connected to a cooling module 4 by an end thereof located opposite to the closed end 22, by that cooling water can be fed into the inner hole 21 through the cooling water tube 24 and thus circulating therein for adapting the vacuum apparatus of rotation motion entry to a high-temperature operating environment.

In this embodiment, the transmission set 3 is composed of two transmission wheels 31, 32 that is used for exemplifying the present disclosure. Nevertheless, the transmission set 3 should includes at least one transmission wheel, each being fixed to the rotary shaft 2 by a means selected from the group consisting of: a screwing means and a key-insetting means, as the transmission wheel 31 shown in this embodiment that is being mounted by an inset key 33 and a screw 34 to the rotary shaft 2 at a position thereof penetrating outside the pressing ring 16 and into the atmosphere. IN addition, each of the two transmission wheels 31, 32 can be a geared belt pulley that is capable of transmitting power from various power source to the rotary shaft 2 for driving the same to rotate.

As shown in the figures, there is an oilless bearing 35 being arranged between the transmission wheel 31 and the pressing ring 16 for overcoming problems caused from excess friction between the rotating transmission wheel 31 and the pressing ring. Moreover, there is an axle retaining ring 36 clampedly mounted on the rotary shaft 2 at a position away from the base and opposite to the transmission wheel 31 for axially positioning the rotary shaft 2. Specially, the axle retaining ring 36 is located at a position corresponding to the axle retaining ring 18, so that the two axle retaining rings 18, 36 can work cooperatively for axially positioning the rotary shaft 2.

As shown in FIG. 8, the cooling module 4 further comprises: a frame 41, having a rotary joint 45 pivotally coupled to an end thereof by the use of a bearing 46 while connecting the rotary joint 45 to an end of the rotary shaft 2 that is protruding outside the pressing ring 16 and into the atmosphere, and thus enabling the rotary joint 45 as well as the rotary shaft 2 to rotate in relative to the frame 41. Moreover, the frame 41 is formed with a flow channel 42, which is arranged in correspondence to the inner hole 21 of the rotary shaft 2, and the flow channel 42 is further connected to an outlet connection 43 while the frame 41 is configured with an inlet connection 44 at a position corresponding to the cooling water tube 24, by that cooling water from the inlet connection 44 can be fed into the rotary shaft 2 and flow toward its closed end 22 through the cooling water tube 24 and then being discharged from the outlet connection 43, that is, cooling water can flow inside the inner hole 21 of the rotary shaft 2 for cooling the same.

In the present disclosure, there are two tiers of airtight isolations formed respectively by the use of the two sealing rings 14 disposed between the first bearing 12 and the second bearing 13, and the shaft seal 15 arranged at the atmosphere end Particularly, it is noted that the sealing rings 14 used in the present disclosure are all square-shaped four-lip sealing rings, and as each sealing ring is capable of using only two of its lips 141 for achieving an airtightness between the sealing ring 14 and the base 11 while enabling anther two lips 141 of the same sealing ring 14 to be used for achieving another airtightness between the sealing ring 14 and the rotary shaft 2; and as there are high vacuum greases O being filled in the concave arc regions 142 formed between any two neighboring lips 141, a good airtightness can be achieved by the cooperation of the sealing rings 14, the rotation shaft 2 and the base 11 and also a low friction contact between the sealing ring and the rotation shaft can be maintained.

Moreover, as the lip flange 153 of the shaft seal 15 is enabled to wrap around the circumference of the rotary shaft 2 when the lip flange 153 is being extended in a direction away from the cavity wall W by the inserting of the rotary shaft 2 into the hole, a negative pressure will be formed at the side of the shaft seal 15 neighboring to the vacuum system for forcing the lip flange 153 to contact with the rotary shaft 2 tightly by the atmospheric pressure and thus forming a circular barrier for isolating the outside world from the vacuum system so as to ensure the vacuum of the vacuum system without obstructing the rotation of the rotary shaft 2, as shown in FIG. 6. However, the O-ring 156 being arranged between the shaft seal 15 and the base 11 is used for further ensuring the airtightness.

Furthermore, the rotary shaft 2 is hollowed to form an inner hole 21 that is provided for a cooling water tube 24 to be inserted therein as the cooling water tube 24 is connected to a cooling module 4, by that the rotary shaft 2 can be cooled down effectively by the circulation of the cooling water flowing inside the cooling water tube 24 so that the aging of the sealing rings 14 and the shaft seal 15 resulting from contacting with the high-temperature rotating rotary shaft 2 can be prevented and thus the airtight isolation between the atmosphere side and the vacuum side can be ensured.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A vacuum apparatus of rotary motion entry, comprising:
a rotary shaft, for power transmission;
a shaft sleeve, having a base with an extension formed extending from an end thereof for fixing the shaft sleeve on a cavity wall of a vacuum system; and
a transmission set, connected to the rotary shaft at a section thereof extruding outside the shaft sleeve and away from the extension of the base to be used for driving the same to rotate;
wherein, the rotary shaft is disposed passing through a hole formed on the base of the shaft sleeve while configured a first bearing, a second bearing, at least one sealing ring and a shaft seal separately inside the hole at positions spaced from each other and corresponding to the rotary shaft in a manner that the first bearing and the second bearing are used for carrying the rotary shaft without obstructing the same from rotating, and the shaft seal is disposed at a side away from the extension of the base; and the shaft seal, being configured with a flake-like lip flange formed at an end thereof away from the extension of the base while extending away the center of the hole, is enabled to warp around the circumference of the rotary shaft by the lip flange thereof as the lip flange is capable of being forced to extend in a direction away from the extension by the inserting of the rotary shaft into the hole.

2. The vacuum apparatus of rotary motion entry of claim 1, wherein each sealing ring is disposed at a position between the first bearing and the second bearing.

3. The vacuum apparatus of rotary motion entry of claim 2, wherein the cross section of each sealing ring is shaped like a square while having four arc-shape lips to be formed respectively at the four corners of the square in a manner that there is a concave arc region being formed between any two neighboring lips.

4. The vacuum apparatus of rotary motion entry of claim 3, wherein the gap between each concave arc region and the rotary shaft is filled with a high-vacuum grease.

5. The vacuum apparatus of rotary motion entry of claim 1, wherein the cross section of each sealing ring is shaped like a square while having four arc-shape lips to be formed respectively at the four corners of the square in a manner that there is a concave arc region being formed between any two neighboring lips.

6. The vacuum apparatus of rotary motion entry of claim 1, wherein the shaft seal is formed with a circular hole at a position thereof corresponding to the rotary shaft, and there is a ring-shape concave formed at the middle section of the hole to be provided for holding a high-vacuum grease therein while enabling the hole to taper into a tapered area with a shrunk inner diameter at an end thereof closer to the lip flange.

7. The vacuum apparatus of rotary motion entry of claim 1, wherein the shaft seal is made of an engineering rubber-plastic product.

8. The vacuum apparatus of rotary motion entry of claim 1, wherein the shaft seal is formed with a circular groove at the outer circumference thereof and the circular groove is provided for an O-ring to inset therein so as to achieve an airtightness effect between the shaft seal and the base.

9. The vacuum apparatus of rotary motion entry of claim 1, wherein the first bearing is disposed inside the hole at an end thereof closer to the extension of the base.

10. The vacuum apparatus of rotary motion entry of claim 1, wherein each of the first bearing and the second bearing is a device selected from the group consisting of: a self-lubricating bearing and a ball bearing.

11. The vacuum apparatus of rotary motion entry of claim 1, wherein the extension of the base is configured with a plurality of via holes, each provided for a bolt to piece therethrough so as to fixedly secure the base on the cavity wall of the vacuum system.

12. The vacuum apparatus of rotary motion entry of claim 1, wherein the base is formed with a circular groove at an end surface thereof just next to its extension, and the circular groove is provided for an O-ring to inset therein so as to achieve an airtightness effect between the cavity wall and the base.

13. The vacuum apparatus of rotary motion entry of claim 1, wherein there is a pressing ring being fixedly disposed at an end of the hole on the base that is close to the shaft seal to be used for fixing the shaft seal by packing.

14. The vacuum apparatus of rotary motion entry of claim 13, wherein the pressing ring is fixed to the base by the use of a plurality of screws; and the pressing ring is formed with an protruding collar at an end thereof that is extending inside the hole and abutting against the shaft seal for fixedly packing the same.

15. The vacuum apparatus of rotary motion entry of claim 14, wherein the pressing ring is further formed with a concave at the end where the protruding collar is disposed; and the concave is provided for an interface bearing to inset therein while enabling one surface of the interface bearing to engage with the interior surface of the concave and another surface thereof to engage with an axle retaining ring as the axle retaining ring is clampedly mounted on the rotary shaft for axially positioning the rotary shaft with respect to the shaft sleeve.

16. The vacuum apparatus of rotary motion entry of claim 1, wherein the rotary shaft is hollowed so as to form an inner hole while designing the hollowed rotary shaft with a closed end provided for penetrating the shaft sleeve and extending into the vacuum system.

17. The vacuum apparatus of rotary motion entry of claim 16, wherein the closed end is integrated with a guide wheel to be used for coupling to and thus driving a device in the vacuum system that is corresponding thereto.

18. The vacuum apparatus of rotary motion entry of claim 17, wherein the guide wheel is a device selected from the group consisting of: a friction wheel, a gear and a worm gear.

19. The vacuum apparatus of rotary motion entry of claim 16, wherein there is a cooling water tube received inside the inner hole of the rotary shaft in a manner that it is connected to a cooling module by an end thereof located opposite to the closed end.

20. The vacuum apparatus of rotary motion entry of claim 19, wherein the cooling module further comprises: a frame, having a rotary joint pivotally coupled to an end thereof by the use of a bearing while connecting the rotary joint to the rotary shaft and thus enabling the rotary joint as well as the rotary shaft to rotate in relative to the frame.

21. The vacuum apparatus of rotary motion entry of claim 20, wherein the frame is formed with a flow channel being arranged in correspondence to the inner hole of the rotary shaft, and the flow channel is further connected to an outlet connection while the frame is configured with an inlet connection at a position corresponding to the cooling water tube.

22. The vacuum apparatus of rotary motion entry of claim 1, wherein the transmission set includes at least one transmission wheel, each being fixed to the rotary shaft by a means selected from the group consisting of: a screwing means and a key-insetting means.

23. The vacuum apparatus of rotary motion entry of claim 22, wherein the transmission wheel is geared belt pulley.

24. The vacuum apparatus of rotary motion entry of claim 22, wherein there is an oilless bearing arranged at a position between the base and each transmission wheel.

25. The vacuum apparatus of rotary motion entry of claim 22, wherein there is an axle retaining ring clampedly mounted on the rotary shaft at a position away from the base with respect to each transmission wheel for axially positioning the rotary shaft.

* * * * *